A. W. HEINLE.
METHOD AND APPARATUS FOR MAKING SPECIALLY SHAPED BARS.
APPLICATION FILED MAR. 19, 1920.

1,378,860.

Patented May 24, 1921.
5 SHEETS—SHEET 1.

Inventor
A. W. Heinle

By Bakewell, Byrnes, Parmelee
his Attorneys

A. W. HEINLE.
METHOD AND APPARATUS FOR MAKING SPECIALLY SHAPED BARS.
APPLICATION FILED MAR. 19, 1920.

1,378,860.

Patented May 24, 1921.
5 SHEETS—SHEET 4.

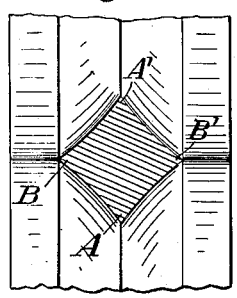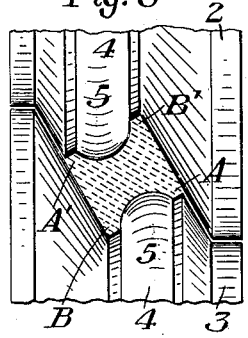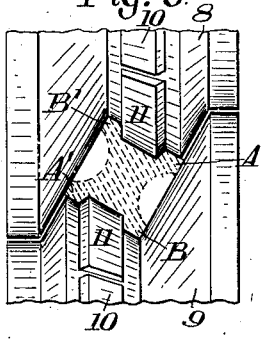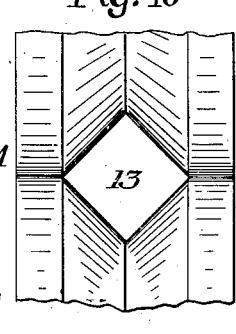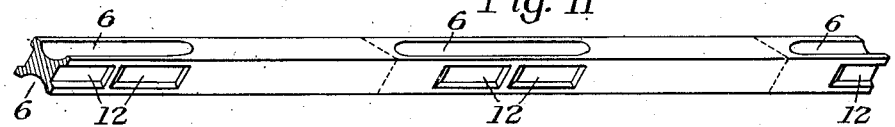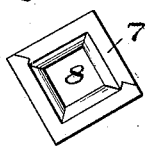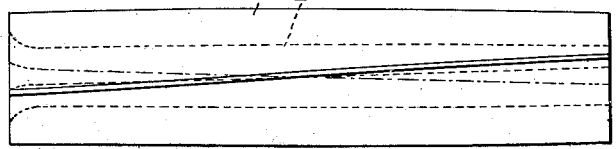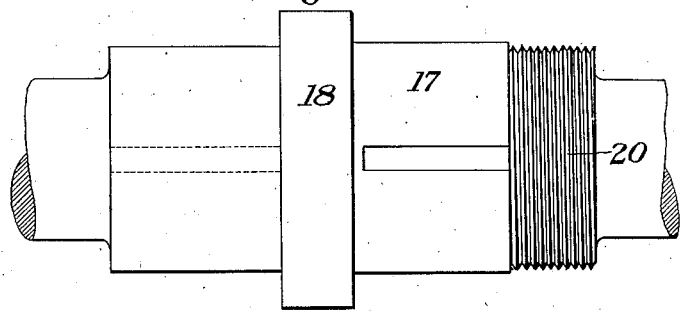

UNITED STATES PATENT OFFICE.

ALBERT W. HEINLE, OF CRAFTON, PENNSYLVANIA, ASSIGNOR OF ONE-HALF TO CHARLES D. RUSSELL AND ONE-HALF TO EDWARD B. SWYGART, OF ST. PAUL, MINNESOTA.

METHOD AND APPARATUS FOR MAKING SPECIALLY-SHAPED BARS.

1,378,860.  Specification of Letters Patent.  Patented May 24, 1921.

Application filed March 19, 1920. Serial No. 367,240.

*To all whom it may concern:*

Be it known that I, ALBERT W. HEINLE, residing at Crafton, Allegheny county, Pennsylvania, have invented a new and useful Improvement in Methods and Apparatus for Making Specially-Shaped Bars, of which the following is a full, clear, and exact description, reference being had to the accompanying drawings, forming part of this specification, in which—

Figs. 7, 8, 9 and 10 are fragmentary views of four sets of rolls which may be used in carrying out the invention and with the blanks shown in section in the several roll passes;

Fig. 11 is a perspective view of a portion of one of the finished shaped bars;

Fig. 12 is a plan view; and Fig. 13 an end view of the twisting guide; and

Fig. 14 is a plan view partly broken away of one of the roll bodies shown in Figs. 3 and 4.

Figure 1:
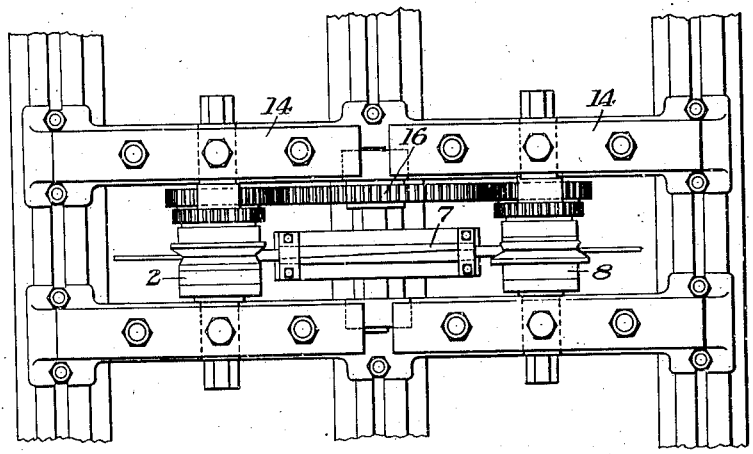
Figure 1 is a plan view partly broken away of one form of rolling mill which may be employed in carrying out my invention.

My invention has relation to the manufacture of specially shaped bars, and is designed to provide a method and means by which bars having a special configuration on two or more surfaces thereof may be accurately formed with the configurations on the different faces of the bars in proper registration with each other.

My invention also provides a method and means of this character by which the shaping may be effected through the agency of a rolling mechanism of simple and compact character capable of handling the work rapidly.

A further object is to provide a method and means which will insure not only the proper and accurate formation of special configurations on the bars, but which will also insure clean sharp corners on the bars.

My invention also provides a method and means whereby the bars may each be acted upon simultaneously by two pairs of rolls, each pair of which imparts a special configuration to one or more faces of the bars with a relatively short spacing between the two sets of rolls and with a minimum twisting of the blank between the rolls.

Other objects and advantages of my invention will hereinafter appear.

The particular nature of the invention will be best understood by reference to the accompanying drawings, in which I have shown the preferred embodiment thereof and which will now be described, it being premised, however, that various changes can be made in the details of the method and in the construction and arrangement and combination of the parts employed and the apparatus used, without departing from the spirit and scope of my invention as defined in the appended claims.

For the purpose of illustrating my invention, I have shown means especially adapted to the formation of a specially shaped bar, which is designed to be subsequently severed into a plurality of lengths, each of said lengths forming a blank from which a spike is to be finished, but it will be understood that my invention is not limited to this particular purpose, but can be used in the manufacture of a variety of other special shapes or bars, in which the configuration thereof is to be repeated at regular definite intervals.

In carrying out my invention, I provide a blank such as indicated in cross section in Fig. 7, being of generally rectangular form, but preferably having its sides concaved or fluted for the purpose which will hereinafter appear.

This blank may be produced by any suitable means and may be given the fluted or concaved form shown by means of giving it a finishing pass, such as is indicated in said figure. For convenience in following the subsequent operations upon this blank, its four corners are designated, respectively, A, B, A' and B'.

The blank is then introduced between a pair of rolls 2 and 3, having a pass of the form shown in Fig. 8. This pass is of generally rectangular form with parallel plain guiding walls which are at an angle of approximately 60° to the longitudinal axes of the rolls and with opposite shaping walls at right angles to the guiding walls. Each of the rolls 2 and 3 is provided with a collar member 4, having on its pass-forming periphery the regularly spaced shaping projections 5, four of such projections being shown on each of these collars. These projections are designed to form the spaced depressions 6, in opposite faces of the bar, as shown in Fig. 11.

In introducing the blank shown in Fig. 7, into the pass shown in Fig. 8, it is turned approximately 30° in an anticlockwise direction, so that the faces A', B' and B, A become the two faces which are acted upon by the shaping walls of the pass shown in Fig. 8.

Figure 6:
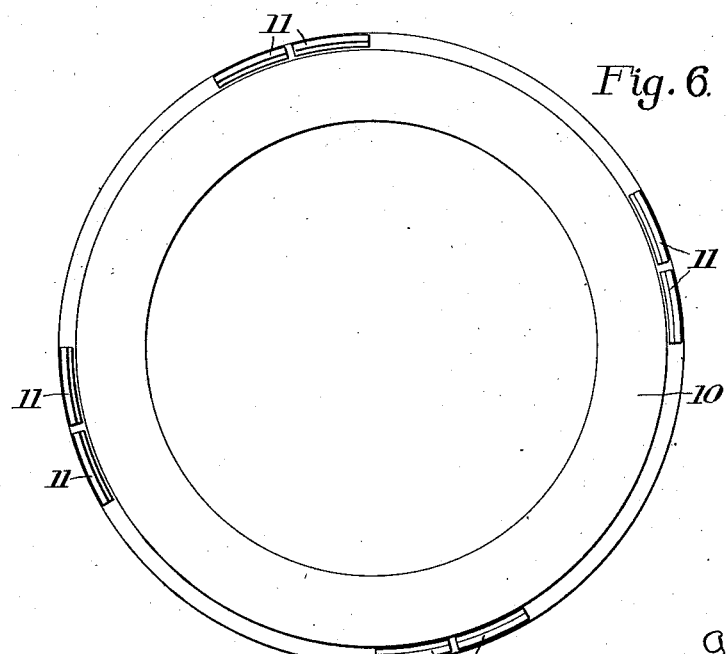

As the blank issues from the pass shown in Fig. 8 with the depressions 6 formed in two of the opposite faces thereof, as described, it enters a twisting guide 7, (shown in detail in Figs. 12 and 13). This is a fixed guide having an approximately rectangular opening or pass 8, therein and which is arranged to twist the bar passing therethrough in an anticlockwise direction through an angle of approximately 30°. As the blank issues from this guide, it enters a roll pass formed by the two rolls 8 and 9. Each of these rolls has a collar member 10, which is provided on its pass-forming periphery with a plurality of equally spaced projections 11, arranged in pairs, as best shown in Fig. 6. Four of these pairs of projections are illustrated and are designed to form the oblong rectangular depressions 12, in the two faces of the blank which were not acted upon by the rolls 2 and 3. Means such as hereinafter described are provided to insure the proper registration of the depressions 12 with the depressions 6.

It will be noted by a comparison of Figs. 8 and 9 that the guiding walls of the pass shown in Fig. 8 are at an angle of approximately 60° to the roll axes measured to one side of the vertical line, while the guiding walls of the pass shown in Fig. 1 are at a similar angle to the roll axes measured at the opposite sides of such vertical line, and that each shaping wall of the pass shown in Fig. 9 is at an angle of substantially 30° to the guiding wall of the pass shown in Fig. 8, which guides that face of the blank which is acted upon by that particular shaping wall in Fig. 9. By reason of this peculiar diagonal arrangement of these two passes, it will be noted that it is necessary to turn the blank only 30° between the two pairs of rolls 2 and 3, and 8 and 9. This can be effected by a relatively short twisting guide with a minimum distortion of the metal, and thereby enables the two sets of rolls to be placed closely together and intergeared so as to turn in unison in a manner hereinafter described.

After leaving the pass shown in Fig. 9, the blank is preferably passed through a finishing pass, such as shown at 13 in Fig. 10, the purpose of this pass being to accurately true up the faces and corners of the blank. The blank is then ready to be severed on the dotted lines shown in Fig. 11, each of the lengths constituting a blank to be used in the manufacture of a spike of special character.

The fluted or concaved surfaces of the blank insures a much more effective gripping of the blank between the rolls in the pass shown in Figs. 8 and 9, and also insures the corners of the blank being held out in these passes. This is due to the fact that these initially concaved faces are flattened out in said passes.

Figure 2:
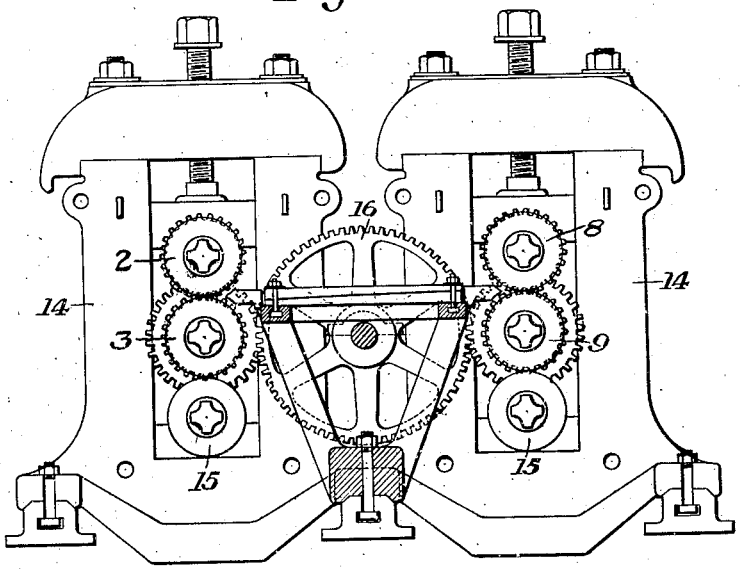
Fig. 2 is a sectional elevation of the same.
Figure 3:
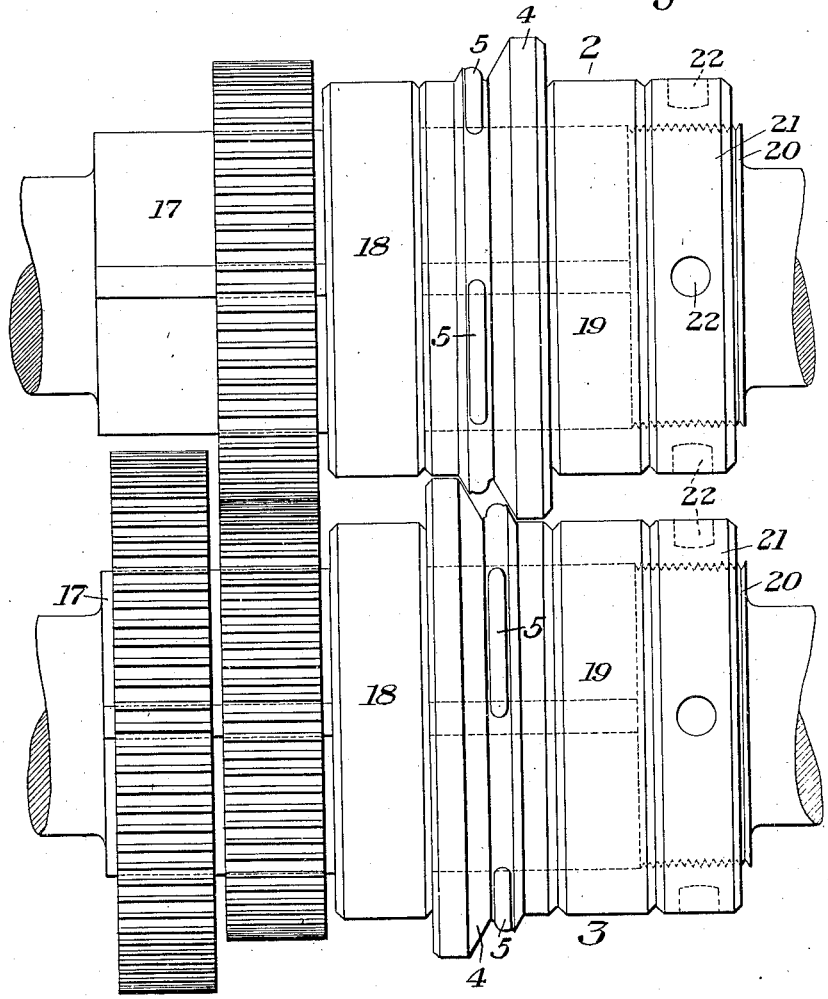
Fig. 3 is an elevation of one set of the rolls employed, with the necks thereof broken away.

It will be readily understood that various constructions and arrangements of rolls may be provided for carrying out my invention. A preferable arrangement has been illustrated in the drawings and will now be described. In Fig. 1, I have shown a plan and in Fig. 2 an elevation of a rolling mill which embodies the rolls shown in Figs. 8 and 9. Each pair of these rolls is suitably journaled in a housing 14, the two housings being preferably rigidly connected together. The mill which I have shown in Figs. 1 and 2 is a three-high mill, but this has nothing to do with the present invention, the lower rolls 15 of the mill being, in so far as the present invention is concerned, dummy rolls, and the passes shown in Figs. 8 and 9 being formed between the upper rolls. The roll 3 is positively driven by any suitable means, not shown, and is positively geared to the upper roll 2. This roll 3 is also positively geared to the roll 9 through the large intermediate gear 16, which is also positively geared to the upper roll 8. In this manner, the two sets of rolls are caused to rotate in unison with each other, the guide 7 being placed intermediate the two sets of rolls, as clearly shown in Figs. 1 and 2.

Each of the rolls 2, 3, 8 and 9 is preferably constructed as follows:

A body 17 is provided, such as shown in Fig. 14, having thereon a seat or seats for the necessary driving gears, a flange 18 at its intermediate portion, and a seating portion at the opposite side of said flange for the pass-forming collar 4 or 10 and for the sleeve 19, seating against the collar 4 or 10. It is also provided with a threaded portion 20, for the lock collar 21. The sleeve 19 is keyed to the roll body and is forced up against the pass-forming collar 4, or 10, by means of the lock collar 21. The latter is preferably provided with suitable wrench seats 22, by means of which it may be actuated.

Figure 4:
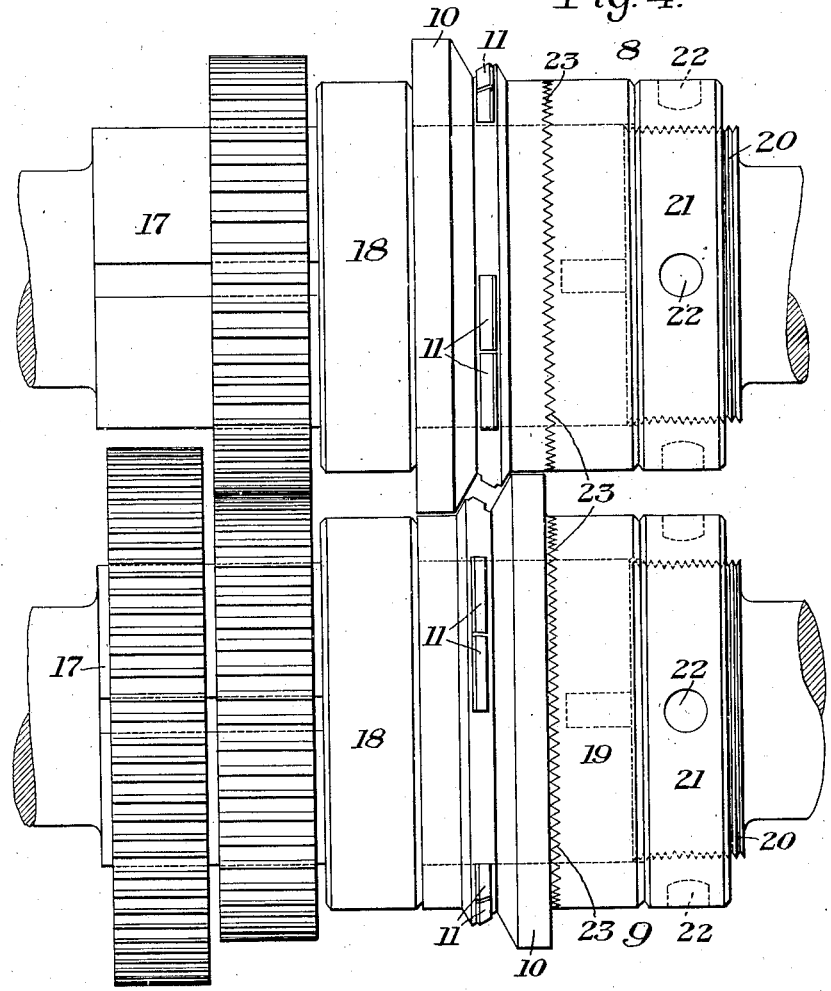
Fig. 4 is a similar view of the second set of rolls.
Figure 5:
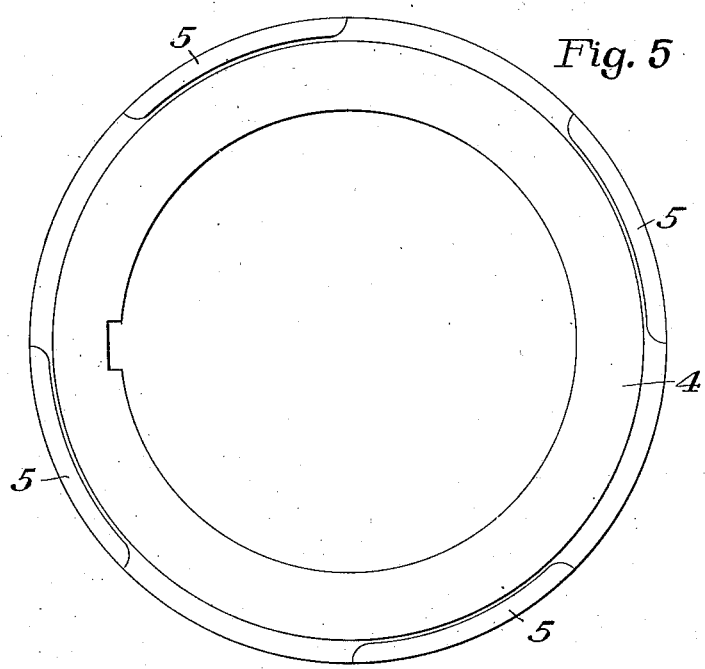
Figs. 5 and 6 are views of the shaping collars employed as a part of the rolls shown in Figs. 3 and 4, respectively.

In order to insure proper registration of the configurations imparted by the rolls 8 and 9 with respect to the configurations imparted by the rolls 2 and 3, I find it desirable to provide some adjustment of the pass-forming collars 10. For this purpose, I provide these collars, as shown in Fig. 4, with toothed portions 23, which are designed to engage similar toothed portions on the sleeve 19. By backing off the locking collars 21, the sleeve 19 may also be backed off, and the collars 10 can then be turned to make the necessary adjustments.

The advantages of my invention will be readily understood by those skilled in the art, since it provides a method and means by which specially shaped bars may be accurately and rapidly formed by a simple and practical arrangement of the roll mechanism. Two or more faces of the bars are simultaneously shaped in a single mill with a minimum loss of heat between the two shaping passes and with a minimum distortion of the metal. It will also be understood that the roll construction is such as to enable the various forms of shaping collars to be readily used interchangeably, thus enabling a variety of shapes to be produced on the said mill.

I claim:

1. The method of forming specially shaped bars, which consists in providing a blank having a polygonal form in cross section, exerting a shaping action upon two opposite faces of said blank with the blank in a position in which its transverse axis is oblique, with respect to a horizontal plane, twisting the blank about its longitudinal axis, and subjecting it to a shaping action upon two other faces thereof with the blank in another position in which its transverse axis is oblique with respect to a horizontal plane, substantially as described.

2. The method of forming specially shaped bars, which consists in providing a blank having a polygonal form in cross section, exerting a shaping action upon two opposite faces of said blank with the blank in a position in which its transverse axis is oblique with respect to a horizontal plane, twisting the blank about its longitudinal axis, subjecting it to a shaping action upon two other faces thereof with the blank in another position in which its transverse axis is oblique with respect to a horizontal plane, the different shaping actions and the twisting being carried on simultaneously at different portions of the blank, and moving the blank continuously forward to the action of the shaping and twisting means, substantially as described.

3. The method of forming specially shaped bars, which consists in providing a blank of approximately rectangular cross section, moving the blank in a diagonal position between shaping surfaces which are at an angle of approximately 60° to the horizontal, twisting the blank about its own axis through an angle or approximately 30°, and moving it to the action of other shaping surfaces which act upon two other faces of the blank and which are at an angle of approximately 120° to the first mentioned shaping surfaces, substantially as described.

4. The method of forming specially shaped bars, which consists in providing a blank of approximately rectangular cross section, moving the blank in a diagonal position between shaping surfaces which are at an angle of approximately 60° to the horizontal, twisting the blank about its own axis through an angle of approximately 30°, and moving it to the action of other shaping surfaces which act upon two other faces of the blank and which are at an angle of approximately 120° to the first mentioned shaping surfaces, said different shaping and twisting operations being carried out simultaneously upon two portions of the length of the blank, substantially as described.

5. The herein described method of forming specially shaped bars, which consists in providing an approximately rectangular blank having its faces longitudinally concaved, subjecting two opposite faces of said blank to a shaping action which removes the longitudinal concavity and imparts a special configuration thereto, twisting the shaped portion of said blank about its longitudinal axis through an angle of approximately 30°, and then subjecting the other faces of the blank to a special shaping action, substantially as described.

6. Apparatus for forming specially shaped bars, comprising two pairs of rolls, each pair of rolls having a diagonal pass provided with parallel guiding walls which are at an angle of approximately 60° to the roll axes, the guiding walls of one pass being at an angle of 120° to the guiding walls of the other pass, and each of said passes having two opposite shaping walls, each of which is at an angle of approximately 30° to a corresponding guiding wall of the other pass, substantially as described.

7. Apparatus for forming specially shaped bars, comprising two pairs of rolls, each pair of rolls having a diagonal pass provided with parallel guiding walls which are at an angle of approximately 60° to the roll axes, the guiding walls of one pass being at an angle of 120° to the guiding walls of the other pass, and each of said passes having two opposite shaping walls, each of which is at an angle of approximately 30° to a corresponding guiding wall of the other pass, together with means for driving the two pairs of rolls in unison with each other, substantially as described.

8. Apparatus for forming specially shaped bars, comprising two pairs of rolls, each pair of rolls having a diagonal pass provided with parallel guiding walls which are at an angle of approximately 60° to the roll axes, the guiding walls of one pass being at an angle of 120° to the guiding walls of the other pass, and each of said passes having two opposite shaping walls, each of which is at an angle of approximately 30° to a corresponding guiding wall of the other pass, together with means for driving the two pairs of rolls in unison with each other, and means for causing the blank to turn or twist through an angle of approximately 30° intermediate the two pairs or rolls, substantially as described.

9. Apparatus for forming specially shaped bars, comprising two intergeared pairs of rolls, said rolls having pass-forming members which form generally rectangular passes, each of which has two opposite guiding walls and two opposite shaping walls, the guiding walls of the two passes being at reverse angles of approximately 60° to the roll axes, and each shaping wall being at an angle of approximately 30° to the corresponding guiding wall of the other pass, substantially as described.

10. Apparatus for forming specially shaped bars, comprising two intergeared pairs of rolls, said rolls having pass-forming members which form generally rectangular passes, each of which has two opposite guiding walls and two opposite shaping walls, the guiding walls of the two passes being at reverse angles of approximately 60° to the roll axes, and each shaping wall being at an angle of approximately 30° to the corresponding guiding wall of the other pass, together with means for turning or twisting the blank intermediate the two pairs of rolls, substantially as described.

11. Apparatus for forming specially shaped bars, comprising two intergeared pairs of rolls, said rolls having pass-forming members which form generally rectangular passes, each of which has two opposite guiding walls and two opposite shaping walls, the guiding walls of the two passes being at reverse angles of approximately 60° to the roll axes, and each shaping wall being at an angle of approximately 30° to the corresponding guiding wall of the other pass, together with means for turning or twisting the blank intermediate the two pairs of rolls, and means whereby the shaping walls of the second pass may be circumferentially adjusted, substantially as described.

12. Apparatus for forming specially shaped bars, comprising two intergeared pairs of rolls, said rolls having pass-forming members which form generally rectangular passes, each of which has two opposite guiding walls and two opposite shaping walls, the guiding walls of the two passes being at reverse angles of approximately 60° to the roll axes, and each shaping wall being at an angle of approximately 30° to the corresponding guiding wall of the other pass, together with means for turning or twisting the blanks intermediate the two pairs of rolls, the roll members forming the shaping rolls of said passes being circumferentially adjustable in one pair of said rolls, substantially as described.

13. Apparatus for forming specially shaped bars, comprising two intergeared pairs of rolls, said rolls having pass-forming members which form generally rectangular passes each of which has two opposite guiding walls and two opposite shaping walls, the guiding walls of the two passes being at reverse angles of approximately 60° to the roll axes, and each shaping wall being at an angle of approximately 30° to the corresponding guiding wall of the other pass, together with means for turning or twisting the blanks intermediate the two pairs of rolls, the shaping walls of one of said passes being formed by removable collar members, substantially as described.

14. Apparatus for forming specially shaped bars, comprising two intergeared pairs of rolls, said rolls having pass-forming members which form generally rectangular passes, each of which has two opposite guiding walls and two opposite shaping walls, the guiding walls of the two passes being at reverse angles of approximately 60° to the roll axes, and each shaping wall being at an angle of approximately 30° to the corresponding guiding wall of the other pass, together with means for turning or twisting the blanks intermediate the two pairs of rolls, the shaping walls of one of said passes being formed by removable collars, said collar members of one pair of rolls having means whereby they may be circumferentially adjusted, substantially as described.

15. Apparatus for forming specially shaped bars, comprising a pair of rolls having pass-forming portions constructed and arranged to form a generally rectangular diagonal pass with two opposite guiding walls and two opposite shaping walls, the shaping walls being formed by collar members having spaced shaping projections thereon, substantially as described.

16. Apparatus for forming specially shaped bars, comprising a pair of rolls having pass-forming portions constructed and arranged to form a generally rectangular diagonal pass with two opposite guiding walls and two opposite shaping walls, the shaping walls being formed by removable collar members having spaced shaping projections thereon, substantially as described.

17. Apparatus for forming specially shaped bars, comprising a pair of rolls having pass-forming portions constructed and arranged to form a generally rectangular diagonal pass with two opposite guiding walls and two opposite shaping walls, the shaping walls being formed by adjustable collar members having spaced shaping projections thereon, substantially as described.

In testimony whereof I have hereunto set my hand.

ALBERT W. HEINLE.